United States Patent Office 3,441,645
Patented Apr. 29, 1969

3,441,645
COMPOSITION FOR TREATING NAILS
Robert W. McKissick, Tulsa, Okla., and John F. Eberhard, Coral Gables, Fla., assignors, by direct and mesne assignments, of eighty percent to Robert W. McKissick, and twenty percent to E. V. McKissick, both of Tulsa, Okla.
No Drawing. Filed May 28, 1964, Ser. No. 376,288
Int. Cl. A61k 7/04
U.S. Cl. 424—61     6 Claims This invention relates to a composition for treating nails. More particularly this invention relates to a composition for treating and/or removing lacquer from nails that renders the nails more plastic and resistant to breaking or splitting and prepares the nails for a subsequent coating of lacquer.

The word "nails" as used in this application shall refer to fingernails, toenails (of man and animal), horns, hoofs, and any keratinous material in general.

It is the common practice for humans to apply lacquer or polish to the exposed surfaces of their fingernails and/or toenails. When it is desirable to remove this lacquer a lacquer remover which consists of one or more lacquer solvents is applied to the nails and the solvent and dissolved polish are then wiped therefrom.

It has been found that these lacquer removers contain materials that have a deleterious effect upon fingernails and toenails, this effect being to both dehydrate the nails and strip the natural oils from the nails that are necessary for healthy nails. This results in relatively hard brittle nails that are prone to split or break thereby soon becoming very unsightly. Such splitting or breaking oftentimes is accompanied by substantial pain and makes manicuring of the nails by conventional means extremely difficult and at times painful.

It has also been found that continued exposure of the nails to relatively strong alkaline waters such as waters containing soaps, common detergents and various solvents and other deleterious materials used in certain industry has the similar affect of dehydrating and de-oiling the nails. Also, the health of the nail cuticle oftentimes suffers from continued contact with liquids of this type.

Attempts to lubricate the nails to prevent this dryness have been made by treating the nails with direct applications of various oils. However, such treatments are undesirable because of the time required and the number of treatments required and also because the oily film left on the surface of the nails prevents the formation of an efficient bond between the nail surface and a coat of lacquer subsequently applied thereto. Also, incorporating oils and/or water in lacquer removers in an effort to reduce the dryness resulting from contacting the nails with the remover have proven unsatisfactory for similar reasons.

Therefore, it is an object of this invention to provide a composition for treatment of nails to prevent dryness and splitting of the nails.

Another object of this invention is to provide a composition for direct application to nails to reduce brittleness, to strengthen the nails and to produce a lustrous surface finish on the nails.

Still another object of this type is to provide a composition for treating nails that conditions the cuticles to facilitate their subsequent removal.

A further object of this invention is to provide a composition for treating nails and for removing a coat of lacquer from the exposed surfaces of the nails that functions also as an anchor base for a subsequent application of a nail lacquer.

Still a further object of this invention is to provide a composition for treating nails that removes previously applied lacquer, reduces brittleness and strengthens the nails, conditions the cuticles, and functions as an anchor base for subsequent applications of nail lacquer.

Yet a further object of this invention is to provide a composition for treating nails as above described that is easy to use and requires relatively short and infrequent applications to the nails.

These and further objects and advantages of this invention will be apparent from the following description and appended claims.

Generally, the composition of this invention consists of a mixture of an amphoteric amino-fatty acid and a carrier liquid such as water, nitro-cellulose lacquer or one or more solvents for nitro-cellulose lacquer. This mixture consists in general of from 0.10 percent to 25.0 percent by weight amphoteric amino-fatty acid and from 99.9 percent to 75.0 percent by weight carrier liquid.

More specifically, improved results have been observed when using a composition consisting of an amphoteric amino-fatty acid in a preferred amount of from 0.75 percent to 4.5 percent by weight, and a carrier liquid, preferably a nitro-cellulose lacquer remover or solvent, in a preferred amount from 99.25 percent to 95.5 percent by weight.

The lacquer solvent used in the composition of this invention is one or more of the commercially available low boiling and medium boiling organic solvents commonly used in the lacquer industry such as acetone, methyl ethyl ketone, methyl isobutyl ketone, ethyl acetate, isopropyl acetate, butyl acetate, amyl acetate, butyl propionate, ethyl lactate, monoethyl ether of ethylene glycol, and the like. However, it has been found that optimum results are obtained when using nitro-cellulose lacquer solvent consisting of from 80 percent to 70 percent by weight ethyl alcohol and from 20 percent to 30 percent by weight acetone.

The amino-fatty acid used in the composition of this invention is represented by the formula

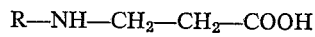

wherein R stands for a member of the carbon group consisting of butyl (4 carbon atoms) through stearyl (18 carbon atoms).

Although all the amino-fatty acids having the above stated formula produce the desired results when incorporated as an ingredient of the composition of this invention, it has been found through extensive experimentation that the fatty acid having the lauryl carbon radical produces optimum results. The specific lauryl fatty acid preferred is N-lauryl beta-amino propionic acid commercially available under the trade name of Deriphat 170-C, produced by the Chemical Division of General Mills.

Therefore, the composition of this invention preferred as giving optimum results consists of:

| Ingredient: | Wt. percentage |
|---|---|
| N-lauryl beta-amino propionic acid | 0.75– 4.50 |
| Ethyl alcohol | 79.40–66.85 |
| Acetone | 19.85–28.65 |

It should be noted that other useful additives can be incorporated as ingredients in this composition. For example, certain commercially available dyes can be incorporated to render a pleasing color to the solution and certain commercially available perfumes can be added to combat or mask the adverse odor of the solvents in the composition. Furthermore, emollients can be added to the composition to produce a composition cream. It may be desirable to add trace amounts of water or alcohol to clarify the composition solution when using a lacquer solvent as the carrier liquid.

When the preferred composition is used as both a lacquer remover and a nail treating composition a relatively thin coat of the composition is applied to the lacquered surface of the nail. Sufficient time is allowed for the nail lacquer to be dissolved after which time the dissolved nail lacquer and the composition are wiped from the nail. There will, however, be a slight film of the composition remaining upon the surface of the nail after the removal of the composition and the dissolved lacquer therefrom. Shortly after the removal of the composition and dissolved lacquer the volatile solvent constituents of the composition remaining on the nail evaporate to leave a thin, dry coating of the amino fatty acid on the surface of the nail. This amino fatty acid is attracted to the protein of the nail and will penetrate at least within the upper layer or portion of the nail. The nail is then ready for an application of a new coat of nail lacquer.

It should be understood that this composition can also be used as a composition for the treating of unpolished nails. When using a composition of this invention as a treating composition for unpolished nails a relatively light coat of the composition is applied to the unpolished surface of the nail. This coating of composition can be allowed to set for a short period of time, usually a matter of a few minutes, to allow the solvent ingredients of the composition to evaporate. Alternatively, the composition can be applied liberally to the nail, allowed to set for a few minutes and then wiped away. In either method of application, because of the attraction of the amino fatty acid for the protein of the nail, a relatively light coating of fatty acid will remain on the surface of the nail after removal of the solvent ingredients of the composition.

As indicated above, water can be used as the carrier liquid for the amino-fatty acid instead of a lacquer solvent. However, when using water as the carrier liquid, it is obvious that the composition will not function as a nail lacquer remover. Furthermore, the improvement in the appearance and health of the nail and cuticle are not as marked as when using the above described preferred composition, as indicated by the following controlled tests.

The fingernails on both hands of the test subject, a 34 year old white male, were defatted and dehydrated with acetone and detergent washes. Thereafter, the nails of one hand were treated once each day with a composition composed of 98.5% nitro cellulose lacquer remover and 1.5% N-lauryl beta-amino propionic acid and the nails on the other hand were treated once each day with a composition composed of 98.5% water and 1.5% N-lauryl beta-amino propionic acid.

After the first treatment the nails receiving the lacquer remover-acid composition exhibited observable hardening whereas the nails treated with the water-acid composition exhibited no observable change. The subjects' nails treated with the lacquer remover-acid composition continued to improve until the third day of treatment when maximum hardness was observed. However, no observable change was detected in the nails treated with the water-acid composition until the fourth day of treatment with maximum hardness being obtained on the seventh day of treatment. At the end of a two week treatment period it was observed that the nails treated with the lacquer remover-acid composition were approximately twice as hard as the nails treated with the water-acid composition.

It is believed that the improved results obtained by treating the nails with the lacquer remover-acid composition result from a synergistic reaction between the nitro cellulose lacquer remover and the N-lauryl beta-amino propionic acid.

Numerous additional tests were run using the composition of this invention in various percentages in order to determine the optimum range. These tests were run on the fingernails of white female subjects.

Using raw lacquer remover on the fingernails of some subjects produced harmful effects immediately observable as frosted surfaces of cuticles and nails after the remover evaporated. This frosted appearance resulted from the dehydrating and defatting action of the raw remover.

Small percentages of the N-lauryl beta-amino fatty acid were added to the remover and this mixture was applied to the nails of other test subjects. It was observed that 0.25% and .50% amino fatty acid in remover solutions produced the same effect as the raw lacquer remover. A .60% amino fatty acid in remover solution did not produce any frosted effect on the nails of the test subjects but did have a drying effect on the nails. A 0.75% amino fatty acid in remover solution neither produced a frosted effect nor the drying effect on the nails of the test subjects. It was observed that from 0.75% to 2.0% amino fatty acid in remover solutions produced the most desirable results with a noticeable increase in nail strength and reduced splitting following the first or second application to the subjects' nails.

At 5.0% amino fatty acid in remover the residue after the remover evaporated began to feel gummy. The gumminess result increased to 11.0% amino fatty acid in remover, after which point it became equivalent to 100% amino fatty acid and was no longer tolerable.

In all the above cited cases the lacquer remover used was the remover described above as preferred, consisting of 80.0% to 70.0% by weight ethyl alcohol and 20.0% to 30.0% by weight acetone.

It is believed that the nitrogen factors in the amino fatty acid attach to the protein in the externally exposed surface of the nail with the carbon radicals trailing freely therefrom to serve as anchoring chains for a subsequently applied coat of nail lacquer. Therefore a coat of lacquer applied to a nail surface previously treated with the composition of this invention will be more strongly bonded to the nail and last longer than similar coats applied to untreated nails.

Furthermore, it is believed that the carbon radicals of the fatty acid that penetrate within the cracks, laminations and/or layers of upper portion of the nails lubricate these spaces thereby rendering the nails somewhat plastic and less subject to splitting or breaking. Additionally, it is believed that the hygroscopic character of the amino fatty acids used in the composition of this invention assist in maintaining a desirable moisture balance in the nail thereby reducing the dryness and brittleness of the nail.

The composition of this invention also functions as a highly efficient nail cuticle conditioner. It has been found that after the cuticles have been exposed to this composition, as during the treating of the nails with the composition, the cuticles become greatly softened and pliable. After one or more such exposures the cuticles no longer become dry and unsightly. Also, since the cuticles are softened and made pliable by treatment with this composition, they are easily and painlessly trimmed or removed using conventional manicuring techniques.

Therefore, from the foregoing description it will be apparent that the present invention provides a novel composition that both improves cuticle health and treats the nails to reduce dryness and brittleness and to strengthen them thereby preventing breaking or splitting. Furthermore, treatment of fingernails with a composition of this invention leaves the nails in an improved state of readiness to receive a new coat of nail lacquer as soon as the composition has dried. Treatment of the nails with a composition of this invention leaves a thin coating of nail base material on the exposed nail surface that serves as an anchoring base for a subsequent application of nail polish. The exposed treated surface of the nail, after the composition has dried, possesses a desirable lustrous finish.

In addition, the preferred composition of this invention has the additional advantage of functioning as a lacquer remover while at the same time improving nail and cuticle health and appearance.

Certain modifications will occur to those skilled in the art and it is accordingly intended that the description

What is claimed is:

1. A composition for treating nails comprising:
   ethyl alcohol in an amount of from 79.40% to 66.85% by weight;
   acetone in an amount of 19.85% to 28.65% by weight; and
   N-lauryl beta-amino propionic acid in an amount of from .75% to 4.50% by weight.

2. A composition for treating nails consisting essentially of:
   a solvent for nitro-cellulose lacquers consisting of:
   ethyl alcohol in an amount of from 80% to 70% by weight, and
   acetone in an amount of from 20% to 30% by weight, and
   an amphoteric amino-fatty acid in an amount of from 4.5% to 0.75% by weight of the composition, said amphoteric amino-fatty acid represented by the formula

R—NH—CH$_2$—CH$_2$—COOH wherein the R is selected from the group consisting of four to eighteen carbon atoms.

3. A method of treating nails comprising applying to the exposed surfaces of said nails, a composition consisting of from 99.9% to 75.0% by weight of a carrier liquid selected from the group consisting of acetone, methyl ethyl ketone, methyl isobutyl ketone, ethyl acetate, isopropyl acetate, butyl acetate, amyl acetate, butyl propionate, ethyl lactate, and monoethyl ether of ethylene glycol and 0.10% to 25.0% by weight amphoteric amino-fatty acid represented by the formula

R—NH—CH$_2$—CH$_2$—COOH wherein the R is selected from the group consisting of four to eighteen carbon atoms.

4. A method of treating nails according to claim 3, wherein said amphoteric amino-fatty acid is N-lauryl beta-amino propionic acid.

5. A method of treating nails comprising applying to the exposed surfaces of said nails a composition consisting of from 94.5% to 99.25% by weight solvent for nitro-cellulose lacquer; selected from the group consisting of acetone, methyl ethyl ketone, methyl isobutyl ketone, ethyl acetate, isopropyl acetate, butyl acetate, amyl acetate, butyl propionate, ethyl lactate, and monoethyl ether of ethylene glycol and 4.5% to .75% by weight amphoteric amino-fatty acid represented by the formula

R—NH—CH$_2$—CH$_2$—COOH wherein the R is selected from the group consisting of four to eighteen carbon atoms.

6. The method of treating nails comprising applying to the exposed surfaces of said nails, a composition consisting of 99.9% to 75.0% by weight of a carrier liquid consisting of nitro-cellulose lacquer and a solvent for nitro-cellulose lacquer, said solvent consisting of ethyl alcohol in an amount of from 80% to 70% by weight, and acetone in an amount of from 20% to 30% by weight, and 0.10% to 25.0% by weight amphoteric amino-fatty acid represented by the formula

R—NH—CH$_2$—CH$_2$—COOH wherein the R is selected from the group consisting of four to eighteen carbon atoms.

References Cited

UNITED STATES PATENTS

| | | | |
|---|---|---|---|
| 1,626,916 | 5/1927 | Burke | 106—195 |
| 2,468,012 | 4/1949 | Isbell. | |
| 3,031,408 | 4/1962 | Perlman et al. | |

ALBERT T. MEYERS, *Primary Examiner.*

D. R. MAHANAND, *Assistant Examiner.*